US009819893B2

(12) United States Patent
Seo et al.

(10) Patent No.: US 9,819,893 B2
(45) Date of Patent: Nov. 14, 2017

(54) TELEVISION TUNER MODULE AND BROADCAST RECEIVING APPARATUS HAVING THE SAME

(75) Inventors: Bright Seo, Cheonan-si (KR); Hyun-jun Kim, Seoul (KR); Sung-soo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 645 days.

(21) Appl. No.: 13/448,896

(22) Filed: Apr. 17, 2012

(65) Prior Publication Data

US 2013/0107128 A1 May 2, 2013

(30) Foreign Application Priority Data

Nov. 1, 2011 (KR) .......................... 10-2011-0112982

(51) Int. Cl.
  *H04N 5/50* (2006.01)
  *H04N 5/455* (2006.01)
  *H04N 5/64* (2006.01)

(52) U.S. Cl.
  CPC ............... *H04N 5/455* (2013.01); *H04N 5/64* (2013.01)

(58) Field of Classification Search
  CPC ............ H04N 5/455; H04N 5/64; H04N 5/50
  USPC ...................................................... 348/836
  See application file for complete search history.

(56) References Cited

U.S. PATENT DOCUMENTS

| 2,722,599 | A | * | 11/1955 | Himes | ................. H05K 9/006 174/350 |
| 4,353,132 | A | | 10/1982 | Saitoh et al. | |
| 4,661,998 | A | | 4/1987 | Yamashita et al. | |
| 4,920,455 | A | * | 4/1990 | Maier | ................. H05K 9/006 334/85 |
| 5,615,019 | A | * | 3/1997 | Yamashita et al. | ........... 386/334 |
| 5,856,656 | A | * | 1/1999 | Kim | ................. H05K 9/0039 219/702 |
| 6,131,023 | A | * | 10/2000 | Matsuura | ................. 455/301 |
| 6,271,603 | B1 | * | 8/2001 | Kajita | ................. H05K 9/006 307/43 |
| 2004/0169775 | A1 | * | 9/2004 | Yamamoto | ............ H05K 9/006 348/836 |
| 2004/0169776 | A1 | * | 9/2004 | Yamamoto | .................... 348/836 |
| 2004/0246687 | A1 | | 12/2004 | Abe et al. | |
| 2005/0018405 | A1 | | 1/2005 | Kawano et al. | |
| 2005/0118868 | A1 | * | 6/2005 | Nagashima | .................. 439/607 |
| 2006/0014560 | A1 | * | 1/2006 | Yoshino | ................. H01Q 1/46 455/550.1 |

(Continued)

FOREIGN PATENT DOCUMENTS

EP 0913924 A1 5/1999
JP 11-27173 A 1/1999

(Continued)

OTHER PUBLICATIONS

Machine level English translation for Kamisaka, JP2011129845 A.*

(Continued)

*Primary Examiner* — Mohammad J Rahman
(74) *Attorney, Agent, or Firm* — Sughrue Mion, PLLC (57) ABSTRACT

A television tuner module includes a tuner that is configured to receive a television broadcast signal; a first shield member that surrounds the tuner and a second shield member that surrounds the first shield member.

15 Claims, 12 Drawing Sheets

(56) References Cited

U.S. PATENT DOCUMENTS

| | | | |
|---|---|---|---|
| 2006/0041919 A1* | 2/2006 | Tokunaga | H04L 12/2801 725/111 |
| 2006/0050184 A1 | 3/2006 | McMiller et al. | |
| 2007/0056007 A1* | 3/2007 | Abe et al. | 725/111 |
| 2007/0291182 A1* | 12/2007 | Kim | H04B 1/0064 348/731 |
| 2011/0007225 A1* | 1/2011 | Kitaguchi | H04N 5/64 348/731 |
| 2012/0264384 A1* | 10/2012 | Imai et al. | 455/150.1 |
| 2013/0107128 A1* | 5/2013 | Seo | H04N 5/455 348/731 |

FOREIGN PATENT DOCUMENTS

| | | | |
|---|---|---|---|
| JP | 2011-129845 A | | 6/2011 |
| JP | 2013197636 A | * | 9/2013 |

OTHER PUBLICATIONS

Liu et al., An Analysis of a Double-layer Electromagnetic Shield for a Universal Contactless Battery Charging Platform, IEEE 2005, pp. 1767-1772.*
Communication issued Jul. 2, 2012 by the European Patent Office in counterpart European Application No. 12159324.8.
Communication from the European Patent Office issued Mar. 14, 2016 in a counterpart European Application No. 12159324.8.
Communication dated Apr. 19, 2017, issued by the European Patent Office in counterpart European Patent Application No. 12159324.8.

* cited by examiner

TELEVISION TUNER MODULE AND BROADCAST RECEIVING APPARATUS HAVING THE SAME

CROSS-REFERENCE TO RELATED APPLICATIONS

This application claims priority from Korean Patent Application No. 2011-0112982, filed Nov. 1, 2011 in the Korean Intellectual Property Office, the disclosure of which is incorporated herein by reference in its entirety.

BACKGROUND

1. Field

Methods and apparatuses consistent with exemplary embodiments relate to a television tuner module, and more particularly, to a television tuner module having two shield members that can shield external noise, and a broadcast receiving apparatus having the same.

2. Description of the Related Art

A broadcast receiving apparatus, such as a television, a video cassette recorder (VCR), a digital versatile disk (DVD) player, a set top box, etc., include a tuner, and can tune a desired frequency and receive a specific broadcast.

However, if the desired frequency is hampered by a transmitting frequency of a cell phone or another transmitter, the broadcast receiving apparatus may have poor reception sensitivity, as compared to when there is no disturbing signal. In a severe case, the broadcast receiving apparatus may not be able to tune to the desired frequency.

In general, the radio frequency immunity defined in the electro-magnetic susceptibility (EMS) item of the electro-magnetic compatibility (EMC) standard is a regulation regarding when a receiving frequency and a disturbing frequency are different from each other. Therefore, even if there is no special measures, EMS standard certification can be generally received.

However, as frequency use is increased, cases that different type of transmitters and receivers use the same frequency bands have been occurred.

For example, since cable broadcasts use a frequency band of 54 MHz-1 GHz and CMA phones or GSM phone use wirelessly a frequency band of 824 MHz-960 MHz, the frequency bands overlap.

In general, various countries use different frequency bands. However, when the transmission method (wired or wireless) is different, many frequency bands overlap, and thus mutual interference between frequency bands may occur.

Figure 1:
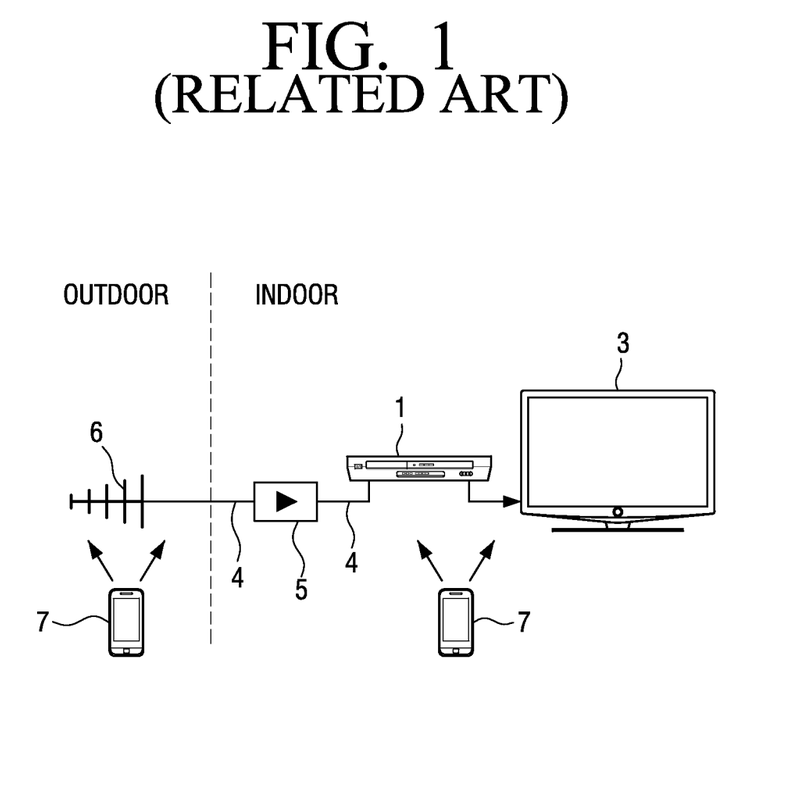
FIG. 1 is a view illustrating a related art broadcast receiving system.

FIG. 1 illustrates a general broadcast receiving system. A set top box 1 is disposed separately from an image display apparatus 3.

In this case, when a wireless communication device such as a cell phone 7 is used, a wireless frequency that is used for indoor and outdoor wireless communication may be interfered with by a broadcast signal that enters the set top box 1.

In FIG. 1, an external antenna 6 is connected with the set top box 1 by a coaxial cable 4. An amplifier 5 may be disposed between the antenna 6 and the set top box 1, if necessary. The cell phone 7 may be an LTE phone for fourth-generation communication.

Figure 2:
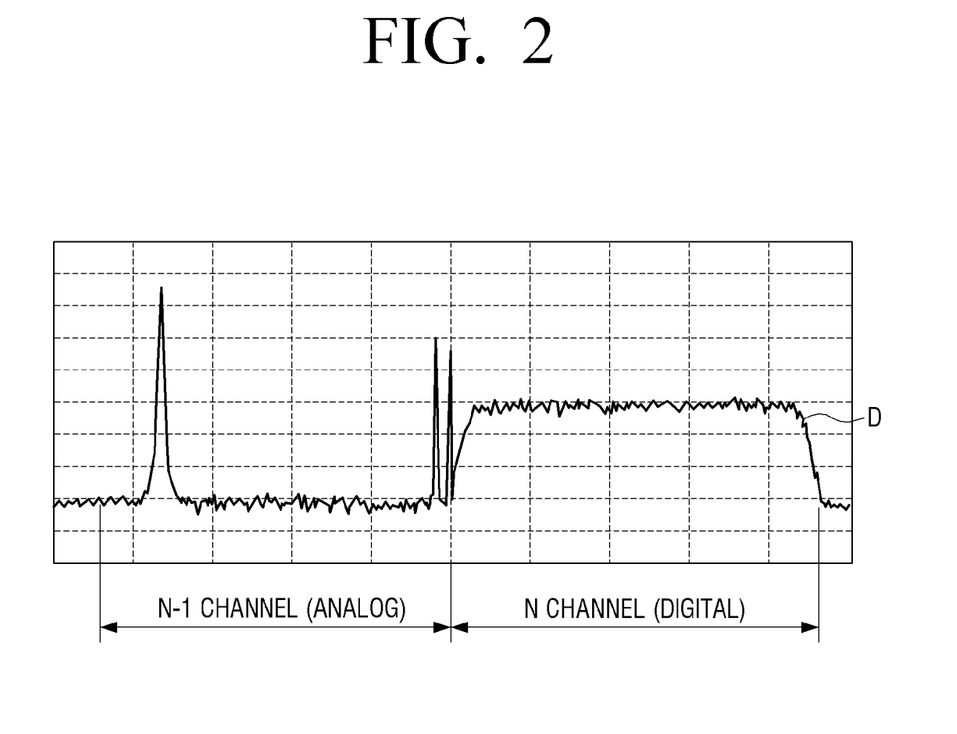
FIG. 2 is a view illustrating an example of a frequency spectrum of a wired broadcast.
Figure 3:
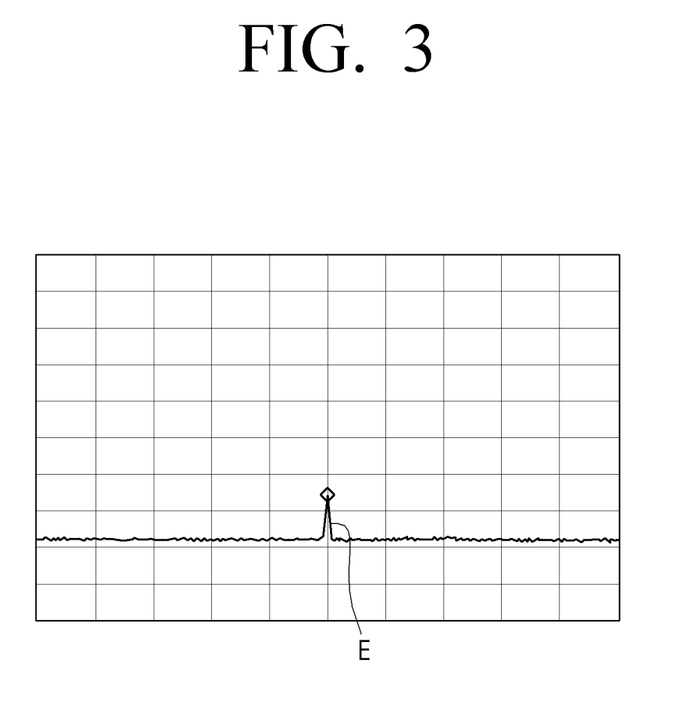
FIG. 3 is a view illustrating an example of a disturbing frequency spectrum overlapped with a wired broadcast frequency.
Figure 4:
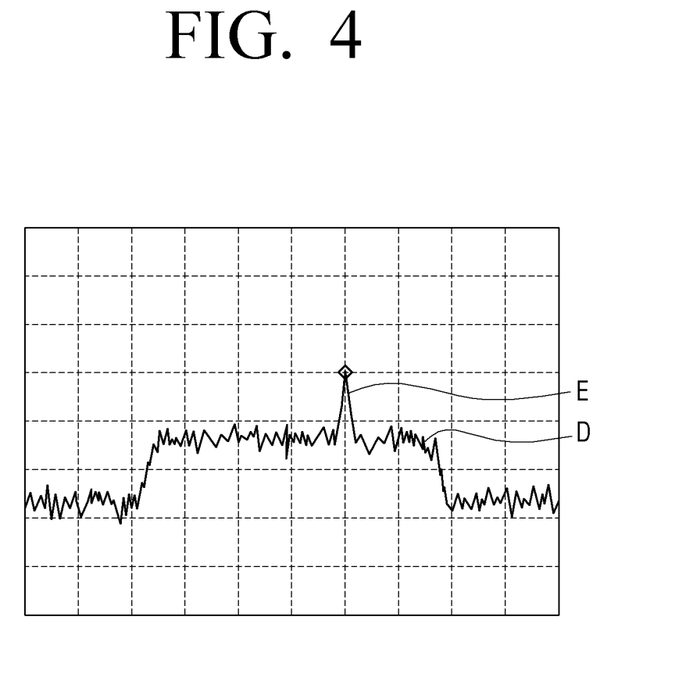
FIG. 4 is a view illustrating a wired broadcast frequency spectrum when a disturbing frequency enters a wired broadcast.

FIGS. 2 to 4 are spectrums illustrating a case that a wired broadcast frequency is disturbed by a disturbing frequency, such as a wireless frequency.

In FIG. 2, a waveform D of an channel N indicates a spectrum of a desired receiving broadcast frequency. In FIG. 3, a waveform E indicates a disturbing frequency that is going to be overlapped with the wired broadcast frequency. FIG. 4 illustrates a spectrum when the disturbing frequency enters the wired broadcast frequency, and thus the waveform D is overlapped with the waveform E.

As described above, when a signal received by the broadcast receiving apparatus, such as the set top box 1, is overlapped with and hampered by a disturbing frequency, the disturbing frequency acts as noise with respect to the receiving signal, so as to degrade the receiving sensitivity. Therefore, the quality of displayed images or sounds may be deteriorated. When the noise is severe, the broadcast signal cannot be received, and as such displaying of the image is stopped.

Accordingly, a set top box that can prevent a broadcast frequency from being interfered with by a wireless frequency being used for a wireless communication is desirable.

SUMMARY

Exemplary embodiments provide a television tuner module having a receiving sensitivity that is not affected when a receiving frequency band is overlapped with a disturbing frequency, and a broadcast receiving apparatus having the same.

According to an aspect of an exemplary embodiment, there is provided a television tuner module including a tuner that receives a television broadcast signal; a first shield member that surrounds the tuner; and a second shield member that surrounds the first shield member.

The second shield member may include at least one contacting portion that is contact with an outer surface of the first shield member.

The at least one contacting portion may be a portion of the second shield member cut from the second shield member and bent to contact the outer surface of the first shield member.

The second shield member may include at least one ground protrusion projecting from the second shield member.

The ground protrusion of the second shield member may include at least one through hole, and the television tuner module is fixed to a ground of a printed circuit board for a broadcast receiving apparatus or a case by the ground protrusion.

The first and second shield members may include a plurality of through holes.

The first and second shield members may be formed of a metal.

The tuner may be formed integrally with a demodulator.

According to an aspect of another exemplary embodiment, there is provided a broadcast receiving apparatus including a case; a signal receiving portion disposed in the case, the signal receiving portion including a television tuner module; and a signal processing portion that modulates a broadcast signal received by the signal receiving portion according to a predetermined broadcast standard; wherein the television tuner module includes a tuner that receives the broadcast signal; a first shield member that surrounds the tuner; and a second shield member that surrounds the first shield member.

The case may be formed of a metal, and the second shield member may include at least one ground protrusion that is in contact with an inner surface of the case.

BRIEF DESCRIPTION OF THE DRAWINGS

The above and/or other aspects will become apparent and more readily appreciated from the following description of the exemplary embodiments, taken in conjunction with the accompanying drawings of which.

Throughout the drawings, like reference numerals will be understood to refer to like parts, components and structures.

DETAILED DESCRIPTION OF THE EXEMPLARY EMBODIMENTS

Hereinafter, certain exemplary embodiments will be described in detail with reference to the accompanying drawings.

The matters defined herein, such as a detailed construction and elements thereof, are provided to assist in a comprehensive understanding of this description. Thus, it is apparent that the exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

In the below disclosure, a broadcast receiving apparatus according to an exemplary embodiment may refer to a separate independent apparatus, such as a set top box, a VTR, a VCR, a digital video recorder (DVR), a DVD player, etc. Also, when the broadcast receiving apparatus is formed as an internal apparatus of a digital TV, an A/V display apparatus or other receivers, the broadcast receiving apparatus according to an exemplary embodiment refers to the internal apparatus or the digital TV, the A/V display apparatus or other receivers having the internal apparatus. For convenience of explanation, hereinafter, an independent broadcast receiving apparatus will be explained as an example.

Figure 5:
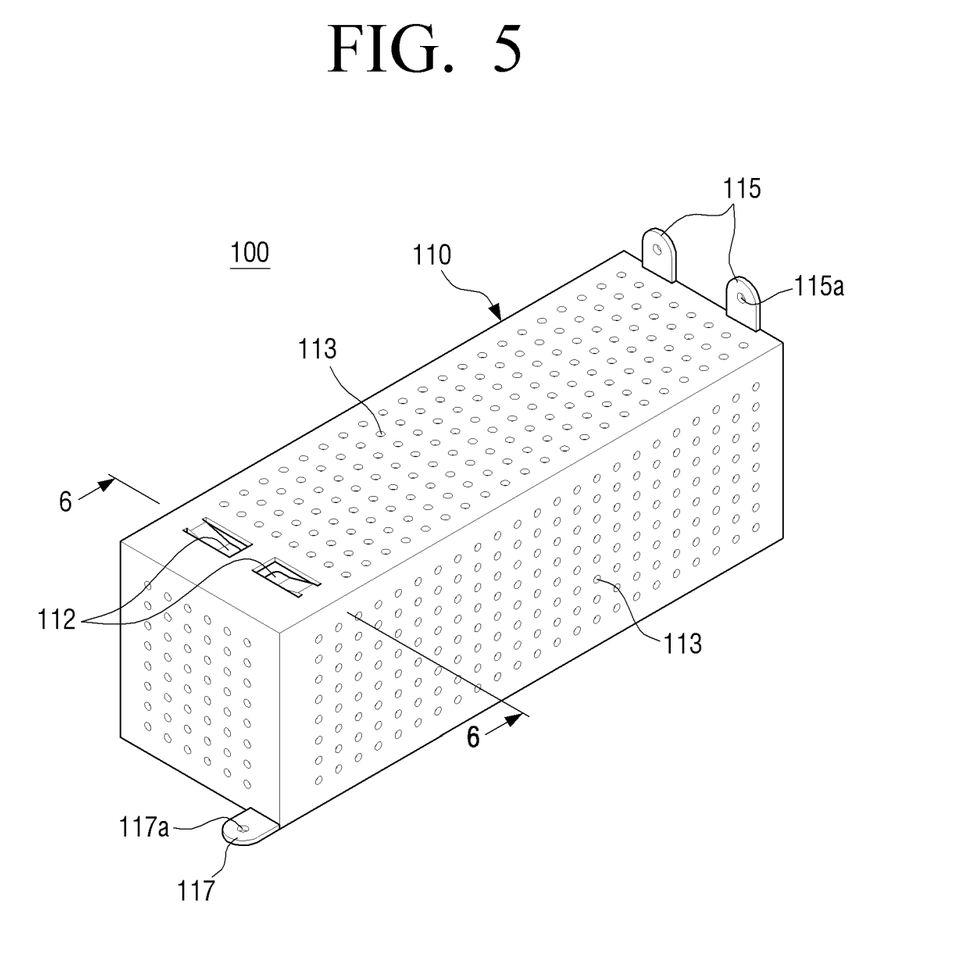
FIG. 5 is a perspective view illustrating a television tuner module according to an exemplary embodiment.
Figure 6:
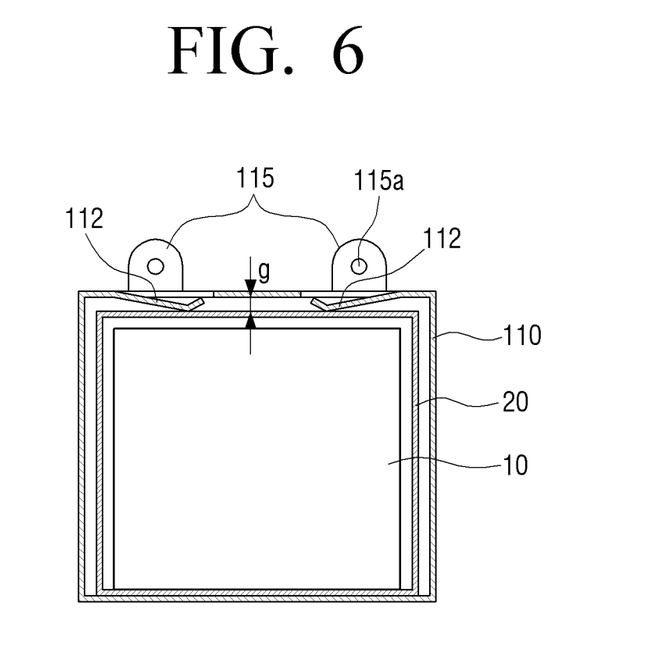
FIG. 6 is a sectional view illustrating the television tuner module of FIG. 5 taken along a line 6-6 in FIG. 5.

FIG. 5 is a perspective view illustrating a television tuner module according to an exemplary embodiment. FIG. 6 is a sectional view illustrating the television tuner module of FIG. 5 taken along a line 6-6 in FIG. 5.

Referring to FIGS. 5 and 6, a television tuner module 100 according to an exemplary embodiment may include a tuner 10, a first shield member 20, and a second shield member 110.

The tuner 10 can tune a frequency to receive a desired television broadcast signal. The tuner 10 can be formed to have various shapes, but a detailed description of the tuner 10 will be omitted. Also, a demodulator 211 (see FIG. 12) may be formed integrally with the tuner 10.

The first shield member 20 may be formed to surround the entire outer surface of the tuner 10 to block out noise that enters the tuner 10 from the outside. A plurality of through holes 21 (see FIG. 7) may be formed on the surface of the first shield member 20 in order to dissipate heat. Also, if the tuner 10 is formed integrally with a demodulator, the first shield member 20 is formed to surround both the tuner 10 and the demodulator. The first shield member 20 may be formed of a metal.

The second shield member 110 is formed to surround the first shield member 20 to block out external noise. If two or more tuners 10 are used, the first shield member 20 is formed to individually surround each of the tuners 10, but the second shield member 110 may be formed to surround all the two or more tuners 10. Alternatively, the second shield member 110 may be formed to cover RF input ports 31 (see FIG. 7) and a demodulator in addition to the tuner 10.

The second shield member 110 is formed of a thin metallic plate and disposed to surround the first shield member 20. When the second shield member 110 is formed to surround the first shield member 20, as illustrated in FIG. 6, there may be a gap g between the first shield member 20 and the second shield member 110. In this case, the second shield member 110 is formed to have at least one contacting portion 112 that is in contact with an outer surface of the first shield member 20 so that the first shield member 20 is grounded to the second shield member 110. In an exemplary embodiment illustrated in FIGS. 5 and 6, the second shield member 110 has two contacting portions 112.

The at least one contacting portion 112 may be formed by cutting a portion of the second shield member 110 and bending the cut portion of the second shield member 110. In other words, as illustrated in FIGS. 5 and 6, portions of the top surface of the second shield member 110 are cut in a substantially flattened U shape, and then, the cut portions are bent downwardly to come in contact with the first shield member 20. Since the bent contacting portions 112 have certain elasticity, the contacting portions 112 can always maintain contact with the first shield member 20. In FIG. 5, the contacting portion 112 is formed to have two substantially flattened U shapes. However, this does not limit the shape and number of the contacting portion 112. The contacting portion 112 may be formed to have various shapes and number according to the shapes of the tuner 10, the first shield member 20, and the second shield member 110.

Also, although not illustrated, the contacting portion 112 connecting the first shield member 20 and the second shield member 110 may be formed as a separate member. For example, the second shield member 110 may be formed to have at least one screw hole into which at least one screw or bolt is tightened, and the screw or bolt is tightened in the screw hole so that a front end of the screw or bolt comes in contact with the first shield member 20. In other words, the contacting portion 112 may be formed by various methods as long as they can electrically connect the first shield member 20 and the second shield member 110 to form a continuous ground.

Further, the second shield member 110 may include at least one ground protrusion 115 and 117 formed to project outside thereof. The at least one ground protrusion 115 and 117 may include at least one of a case ground protrusion 115 connecting a case in which the television tuner module 100 is mounted and the second shield member 110 and a board ground protrusion 117 connected to a ground portion of a printed circuit board.

The ground protrusion 115 and 117 is a thin plate projecting the outside of the second shield member 110 and is formed in a substantially U shape, a rectangular shape, etc. The ground protrusion 115 and 117 may have a size enough to form at least one through hole 115a and 117a into which at least one screw or bolt for connecting the ground is inserted.

As illustrated in FIG. 5, the second shield member 110 includes two case ground protrusions 115 projecting from a top surface thereof and one board ground protrusion 117 projecting from a bottom surface thereof. The case ground protrusions 115 and the board ground protrusion 117 have a through hole 115a and 117a into which a screw or a bolt is inserted, respectively.

Also, the second shield member 110 may have a plurality of through holes 113 for dissipating heat on at least one portion of the second shield member 110. FIG. 5 illustrates the second shield member 110 having a plurality of through holes 113 formed on the entire surface of the second shield member 110. The shape or number of the plurality of through holes 113 is not limited as long as the plurality of through holes 113 can effectively dissipate heat of the tuner 10.

Figure 7:
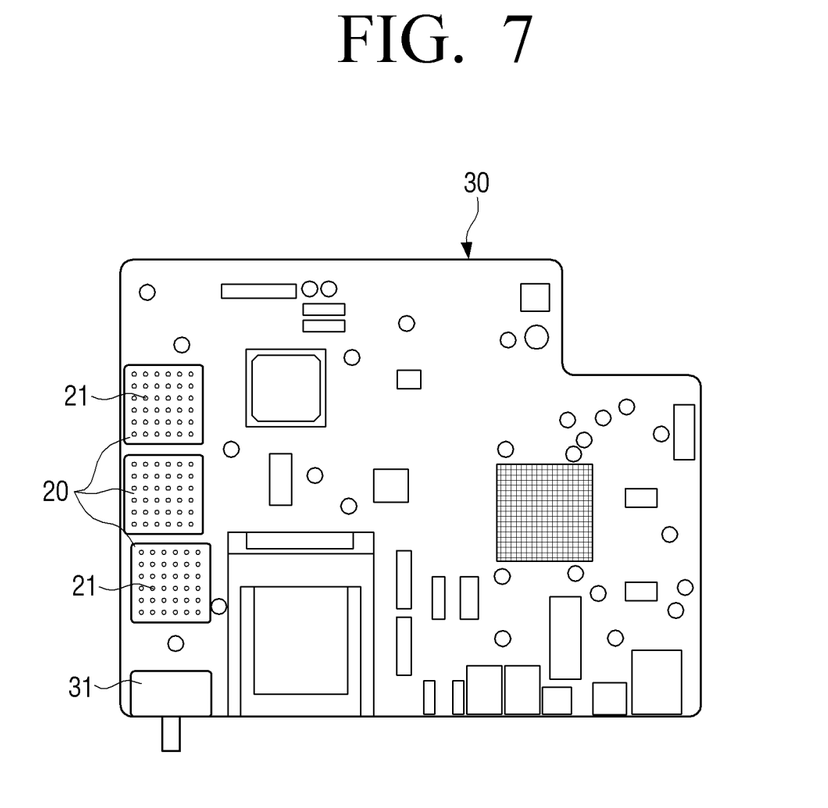
FIG. 7 is a view schematically illustrating a printed circuit board of a broadcast receiving apparatus.
Figure 8:
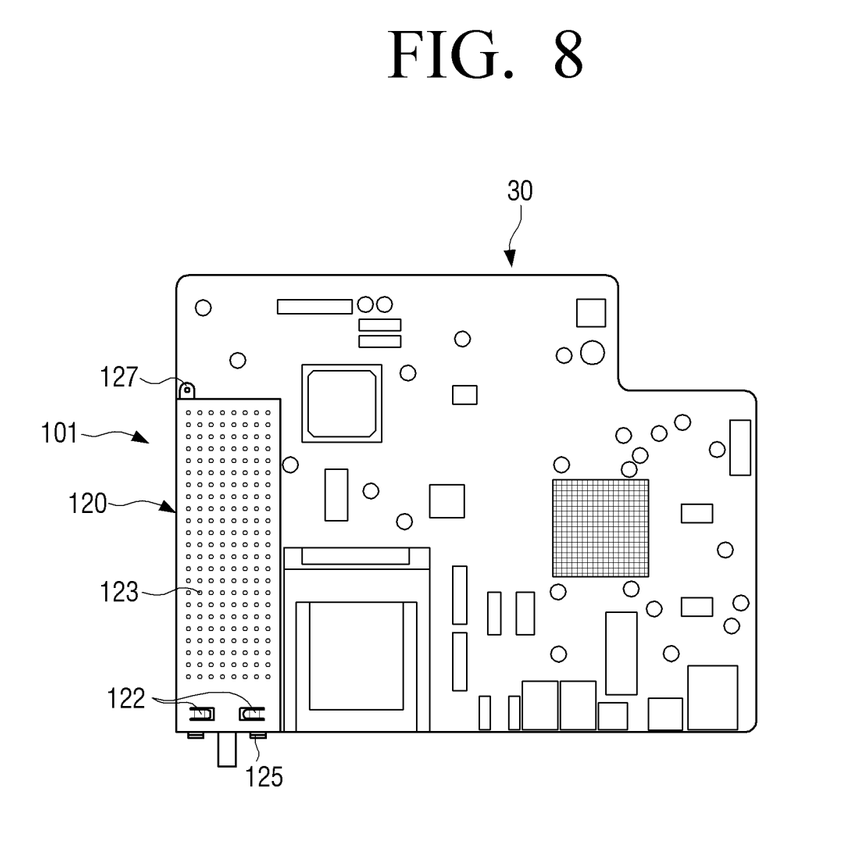
FIG. 8 is a view schematically illustrating a printed circuit board of a broadcast receiving apparatus having a television tuner module according to an exemplary embodiment.
Figure 9:
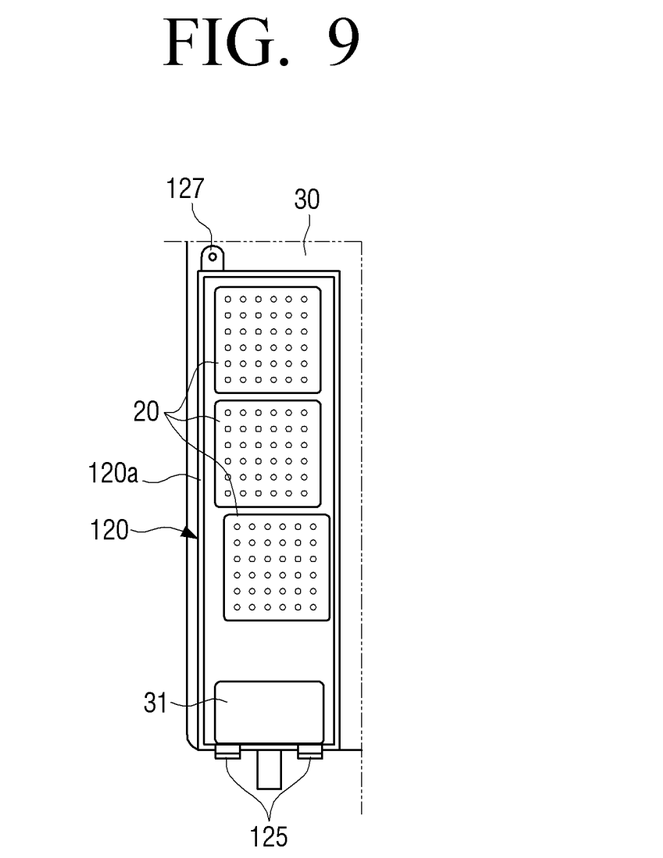
FIG. 9 is a partial view illustrating the printed circuit board of FIG. 8 when a top cover of a second shield member of a television tuner module is removed.

FIG. 7 illustrates a printed circuit board 30 for a broadcast receiving apparatus on which three tuners individually surrounded by the first shield member 20 are disposed. FIG. 8 illustrates the printed circuit board 30 on which a second shield member 120 surrounding all the three tuners of FIG. 7 is disposed. FIG. 9 is a partial view illustrating the second shield member 120 of FIG. 8 a top cover of which is removed.

Referring to FIG. 9, the second shield member 120 is formed to surround all three first shield members 20 individually wrapping the tuner and a RF input port 31. The three tuners are directly mounted on the printed circuit board 30 and each of the tuners is wrapped by each of the first shield members 20. The first shield member 20 has a plurality of heat holes 21 for dissipating heat. Also, the second shield member 120 has four side walls 120a directly fixed on the printed circuit board 30 and has no bottom surface corresponding to the printed circuit board 30. In other words, the second shield member 120 according to an exemplary embodiment is formed to be directly fixed onto the printed circuit board 30 to surround the tuners directly mounted on the printed circuit board 30.

Also, the second shield member 120 according to an exemplary embodiment may include a plurality of ground protrusions 125 and 127. For example, as illustrated in FIG. 9, the second shield member 120 includes two case ground protrusions 125 and one board ground protrusion 127. The second shield member 120 may include a plurality of holes 123 and contacting portions 122.

Figure 10:
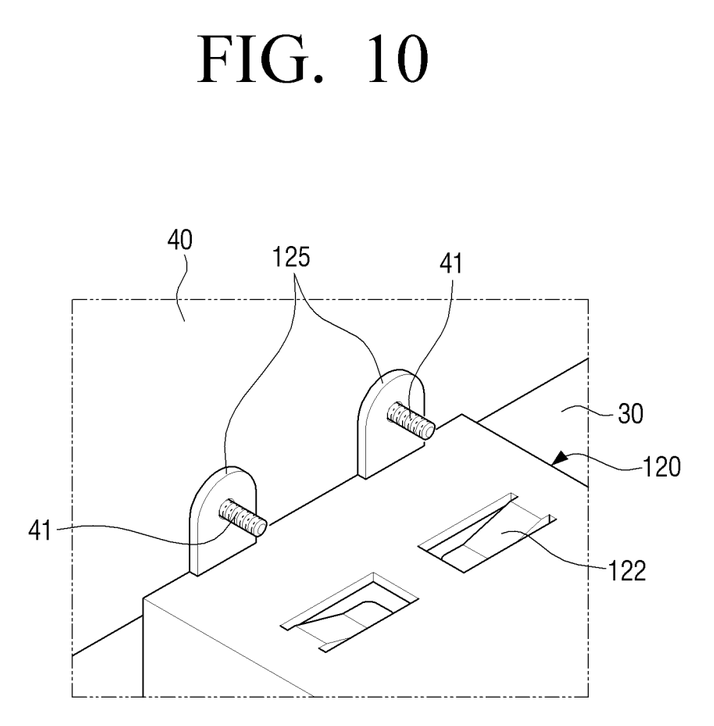
FIG. 10 is a partial view illustrating a state that the television tuner module of FIG. 8 is fixed to a case of a broadcast receiving apparatus.

FIG. 10 illustrates a state that the two case ground protrusions 125 of the second shield member 120 are fixed to an inner wall of the case 40 of the broadcast receiving apparatus. Referring to FIG. 10, the two case ground protrusions 125 of the second shield member 120 are fixed to a side wall of the case 40 by two screws 41. Accordingly, the second shield member 120 is grounded through the case 40. If the case ground protrusions 125 are connected to the case 40 and the case 40 is formed of a metal, there is a ground effect so as to more effectively block out noise.

Figure 11:
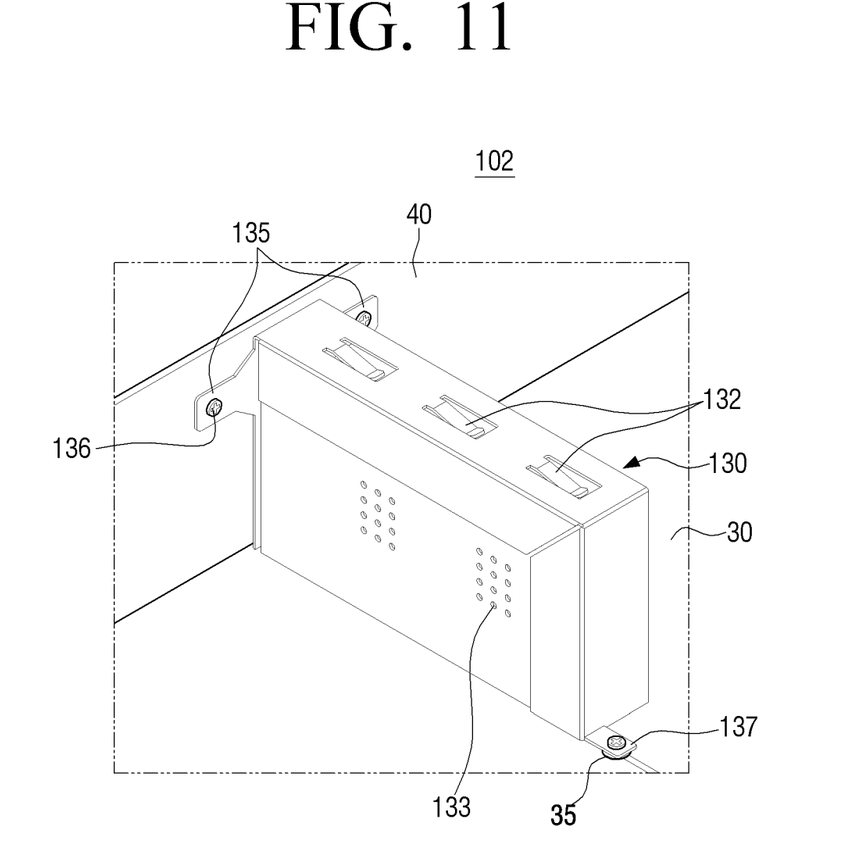
FIG. 11 is a partial perspective view illustrating a different shape of a television tuner module disposed on a printed circuit board of a broadcast receiving apparatus.

FIG. 11 is a perspective view illustrating a television tuner module 102 according to an exemplary embodiment.

Referring to FIG. 11, at least one tuner surrounded by a first shield member is disposed within the television tuner module 102.

The second shield member 130 includes two case ground protrusions 135 projecting outside from opposite side walls and one board ground protrusion 137 projecting from a bottom surface thereof. The two case ground protrusions 135 are fixed onto the side wall of the case 40 by screws 136 and the one board ground protrusion 137 is fixed onto the ground portion 35 of the printed circuit board 30. Also, three contacting portions 132 are formed on a top surface of the second shield member 130. The contacting portions 132 are formed by cutting a portion of the second shield member 130 as the same as the contacting portion 112 of the second shield member 110 of the television tuner module 100 illustrated in FIG. 5. The second shield member 130 may include a plurality of holes 133.

Since the television tuner module 100, 101 and 102 according to an exemplary embodiment has the tuner that is doubly shielded by two shield members, external noise entering the tuner can be effectively blocked out.

Hereinafter, a broadcast receiving apparatus including a television tuner module according to an exemplary embodiment having the above-described structure will be explained with reference to FIG. 12.

Figure 12:
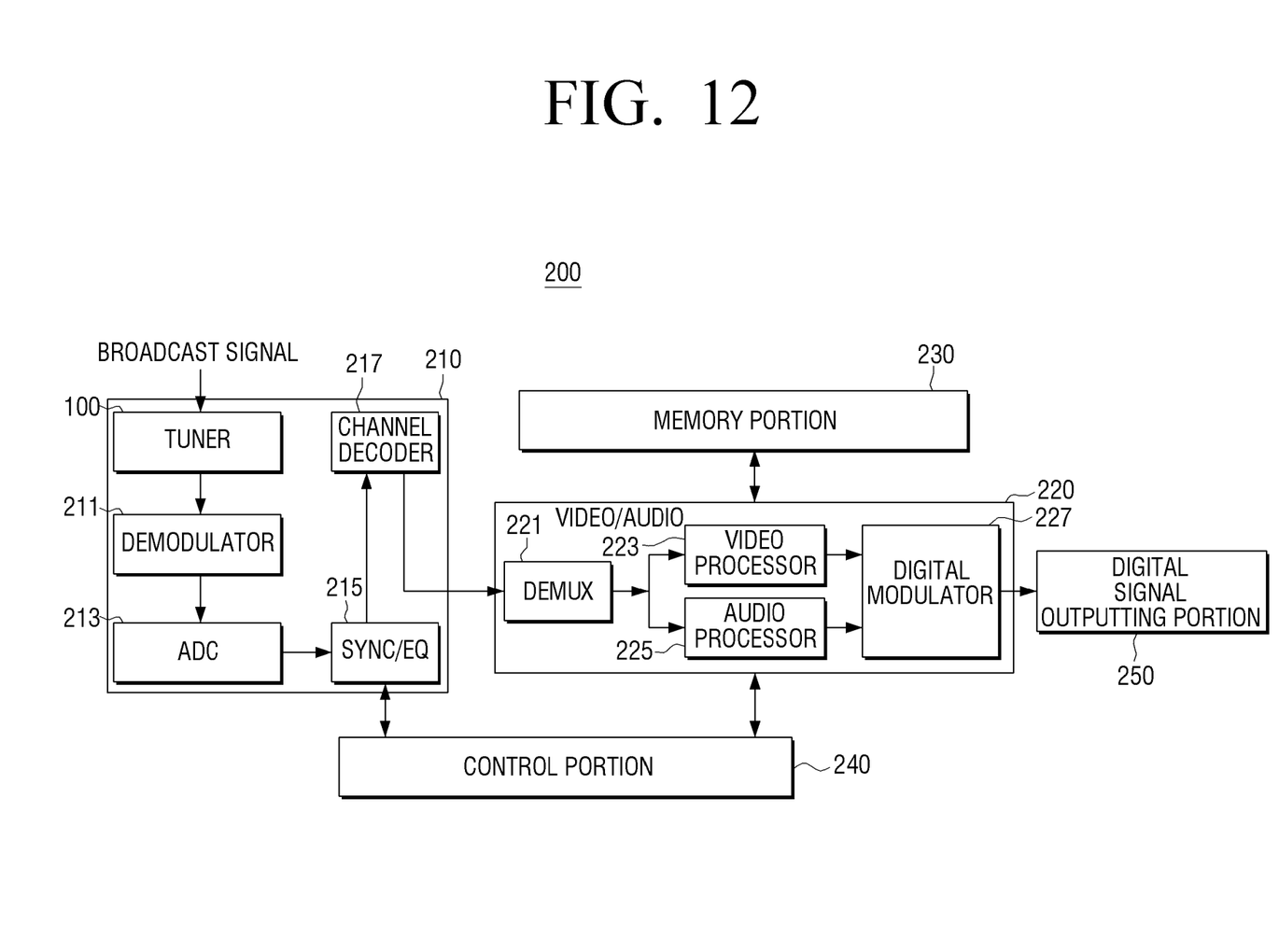
FIG. 12 is a functional block diagram illustrating a broadcast receiving apparatus according to an exemplary embodiment.

FIG. 12 is a functional block diagram illustrating a broadcast receiving apparatus according to an exemplary embodiment.

Referring to FIG. 12, the broadcast receiving apparatus 200 may include a signal receiving portion 210, a signal processing portion 220, a memory portion 230, a control portion 240, and a digital signal outputting portion 250.

The signal receiving portion 210 receives broadcast signals for terrestrial broadcasts, cable broadcasts, and satellite broadcasts of various countries. At this time, the broadcast signal can be received by at least one way of an analog method and a digital method. The broadcast signal may be received, as the digital method, in the form of, for example, quadrature amplitude modulation (QAM), orthogonal frequency division multiplexing (OFDM), vestigial side band (VSM), quadrature phase shift keying (QPSK), etc.

The VSB digital terrestrial broadcasts may use various transmitting methods such as the advanced television systems committee (ATSC) system of America, the European DVB-T system based on the coded orthogonal frequency modulation (COFDM), the Japanese ISDB-T based on the bandwidth segmented transmission (BST)-OFDM, the Chinese terrestrial digital multimedia television broadcasting (DMB-T), the advanced digital television broadcast-terrestrial (ADTB-T), BDB-T, CDTB-T, the synchronized multi-carrier CDMA (SMCC), etc.

Also, if a broadcast signal is received through an antenna, the signal receiving portion 210 may synchronize a digital broadcast signal, an analog broadcast signal or a specific type signal of digital broadcast signals to receive a desired broadcast signal and perform demodulation. Further, the signal receiving portion 210 can convert a demodulated analog signal into a digital signal and can output the converted digital signal.

The signal receiving portion 210 may output information about a channel selected by a user through an external interface, that is, a broadcast signal of a selected channel under the control of the control portion 240.

For this, the signal receiving portion 210 may include some or all of the television tuner module 100, a demodulator 211, an analog-digital converter (ADC) 213, a synchronizer and equalizer (Sync/EQ) 215, and a channel decoder 217. The television tuner module 100, the demodulator 211, the analog-digital converter 213, the synchronizer and equalizer 215, and the channel decoder 217 may be disposed in the case 40.

The television tuner module 100 includes the tuner 10 that synchronizes and outputs a specific type of broadcast signal. As described above, the tuner 10 is doubly shielded by the first shield member 20 and the second shield member 110. The demodulator 211 may demodulate a broadcast signal provided through the tuner 10. The demodulator 211 may be disposed inside the second shield member 110 of the television tuner module 100.

Also, the analog-digital converter 213 may perform information transformation. The synchronizer and equalizer 215 may synchronize a channel selected by a user and correct a distortion of the channel. At this time, the synchronizer and equalizer 215 may operate under the control of the control portion 240.

The signal processing portion 220 may receive a broadcast signal of a specific channel provided by the signal receiving portion 210 and divide the broadcast signal into video and audio data. The divided video and audio data may be stored in the memory portion 230 under the control of the control portion 240. Also, for example, using a microprocessor, the signal processing portion 220 can manage each of the divided video and audio data through the microprocessor. In other words, the microprocessor may receive entering video and audio data, respectively, and store them again in the memory portion 230, or perform a signal-processing after reading stored data. Herein, the signal-processing may include, for example, decoding, scaling or frame interpolation and the like.

The signal processing portion 220 modulates a broadcast signal into a digital channel format and outputs the result. In this process, the signal processing portion 220 may process the broadcast signal to meet a digital method used in a certain country. For example, video and audio data may be modulated into a digital channel format such as QAM, VSB, QPSK, OFDM, etc. to meet the broadcast standard of ATSC and provided to the digital signal outputting portion 250.

For this, the signal processing portion 220 may include a demultiplexer (demux) 221, video and audio processors 223 and 225, and a digital modulator 227. The demux 221 may receive a broadcast signal of a selected channel, store the received broadcast signal in association with the memory portion 230, divide the broadcast signal into video and audio data corresponding to each programs of the selected channel and provide them to a video processor 223 and an audio processor 225.

The video and audio processors 223 and 325 perform a signal-processing of received video and audio data. Herein, the signal-processing may include decoding, scaling, frame interpolation and the like.

The digital modulator 227 modulates a broadcast signal into a digital format using at least one method among QAM, VSB, OFDM and QSPK, and outputs the result. At this time, the digital modulator 227 may process the received broadcast signal to meet a certain type of digital methods.

The digital signal outputting portion 250 outputs the video and audio data modulated into a digital channel format which is provided by the signal processing portion 220. The digital signal outputting portion 250 may be formed in a shape of a connector or a jack, and may be connected with an individual image display apparatus 3 (see FIG. 1) such as a digital broadcast receiver, etc. As a result, the image display apparatus 3 receives broadcast signals of various channels and displays them on a screen thereof.

Since the tuner of the signal receiving portion is disposed inside the second shield member or both the tuner and the demodulator are disposed inside the second shield member, the broadcast receiving apparatus according to an exemplary embodiment as described above can effectively block out an external wireless frequency band that is the same as or similar to a broadcast frequency band from entering the signal receiving portion as noise. Specially, since the tuner is doubly shielded by the first shield member and the second shield member, the tuner can effectively block out external noise.

With a broadcast receiving apparatus according to an exemplary embodiment, since inflow of noise is reduced, quality of video and audio of the broadcast receiving apparatus is enhanced.

While exemplary embodiments have been described, additional variations and modifications of the embodiments may occur to those skilled in the art. Therefore, it is intended that the appended claims shall be construed to include both the above embodiments and all such variations and modifications that fall within the spirit and scope of the inventive concepts.

What is claimed is:

1. A television tuner module comprising:
   a tuner that is configured to receive a television broadcast signal;
   a first shield member that surrounds top and side surfaces of the tuner; and
   a one-piece second shield member that surrounds top and side surfaces of the first shield member and comprises at least one contacting portion that is in contact with an outer surface of the first shield member,
   wherein the at least one contacting portion is a portion of the second shield member cut from the second shield member and bent to contact the outer surface of the first shield member.

2. The television tuner module of claim 1, wherein the first and second shield members are configured to block out external noise from the tuner.

3. The television tuner module of claim 1, wherein the first and second shield members comprise a plurality of through holes.

4. The television tuner module of claim 1, wherein the first and second shield members are formed of a metal.

5. The television tuner module of claim 1, wherein the tuner is formed integrally with a demodulator.

6. A broadcast receiving apparatus comprising:
   a case;
   a signal receiving portion disposed in the case, the signal receiving portion comprising a television tuner module; and
   a signal processing portion that modulates a broadcast signal received by the signal receiving portion;

wherein the television tuner module comprises:
a tuner that is configured to receive the broadcast signal;
a first shield member that surrounds top and side surfaces of the tuner; and
a one-piece second shield member that surrounds top and side surfaces of the first shield member and comprises at least one contacting portion that is in contact with an outer surface of the first shield member, and
wherein the at least one contacting portion is a portion of the second shield member cut from the second shield member and bent to contact the outer surface of the first shield member.

7. The broadcast receiving apparatus of claim 6, wherein the first and second shield members are configured to block out external noise from the tuner.

8. The broadcast receiving apparatus of claim 6, wherein the case is formed of a metal, and
the second shield member comprises at least one ground protrusion that is in contact with an inner surface of the case.

9. The broadcast receiving apparatus of claim 6, wherein the first and second shield members comprise a plurality of through holes.

10. The broadcast receiving apparatus of claim 6, wherein the first and second shield members are formed of a metal.

11. The broadcast receiving apparatus of claim 6, wherein the tuner is formed integrally with a demodulator.

12. The television tuner module of claim 1, wherein the second shield member comprises at least one ground protrusion projecting from the second shield member.

13. The television tuner module of claim 12, wherein the at least one ground protrusion of the second shield member comprises at least one through hole, and the television tuner module is fixed to a ground of a printed circuit board for a broadcast receiving apparatus or a case by the at least one ground protrusion.

14. The broadcast receiving apparatus of claim 6, wherein the second shield member comprises at least one ground protrusion projecting from the second shield member.

15. The broadcast receiving apparatus of claim 14, wherein the at least one ground protrusion of the second shield member comprises at least one through hole, and the television tuner module is fixed to the case by the at least one ground protrusion.

* * * * *